United States Patent [19]

Sarazin et al.

[11] 3,996,092
[45] Dec. 7, 1976

[54] METHOD OF MAKING LAMINATED ABSORBER MEMBER FOR FLAT PLATE COLLECTOR

[75] Inventors: Richard George Sarazin, Onalaska; Larry Dale Olson, Viroqua, both of Wis.

[73] Assignee: Universal Oil Products Company, Des Plaines, Ill.

[22] Filed: Feb. 6, 1976

[21] Appl. No.: 656,052

Related U.S. Application Data

[62] Division of Ser. No. 581,250, May 27, 1975.

[52] U.S. Cl. .............................. 156/309; 126/270; 126/271; 156/265; 156/300; 156/330; 156/292; 156/313; 165/170; 237/1 A; 428/188; 428/201; 428/196
[51] Int. Cl.² ...................... C09J 5/00; C09J 7/00
[58] Field of Search .......... 156/330, 182, 313, 292, 156/309, 300, 63, 280, 264, 290, 265, 291; 428/193, 201, 196, 188, 413, 417, 415, 418, 416; 126/270, 271; 237/1 A; 165/170

[56] References Cited

UNITED STATES PATENTS

| | | | |
|---|---|---|---|
| 2,465,348 | 3/1949 | Boehm et al. | 156/156 |
| 2,662,273 | 12/1953 | Long | 165/170 |
| 3,089,480 | 5/1963 | Duncan | 126/270 |
| 3,399,664 | 9/1968 | Suhay | 126/271 |
| 3,536,546 | 10/1970 | Nielsen et al. | 428/416 |
| 3,620,206 | 11/1971 | Harris et al. | 126/271 |

*Primary Examiner*—William A. Powell
*Assistant Examiner*—J. J. Gallagher
*Attorney, Agent, or Firm*—James R. Hoatson, Jr.; Barry L. Clark; William H. Page, II

[57] ABSTRACT

Flat plate absorber member includes a flat heat absorbing sheet of a thin metal foil such as copper, or a thin plastic film such as polyvinyl fluoride, bonded to a channeled substrate, and particularly to a plastic laminate such as a glass epoxy laminate. The improved absorber member provides an energy collecting efficiency which is much greater than that of a much more expensive conventional collector having a series of copper tubes soldered to a copper sheet. The absorber is preferably made by the method of taking a base sheet of fully cured glass epoxy laminate and overlying it with a precut, patterned intermediate layer of semi-cured glass epoxy which defines the depth of the side walls of the channels. The cover sheet of metal foil or plastic film is then placed over the semi-cured glass epoxy intermediate layer and heat and pressure are applied to bond the semi-cured glass epoxy to the cover sheet and to the previously cured base sheet.

2 Claims, 5 Drawing Figures

METHOD OF MAKING LAMINATED ABSORBER MEMBER FOR FLAT PLATE COLLECTOR

This is a division of application Ser. No. 581,250, filed May 27, 1975.

BACKGROUND OF THE INVENTION

The invention relates to solar collectors of the type in which a flat plate absorber member collects heat from the sun and transfers it to a fluid which is flowing in heat exchange relation with the absorber member. Conventionally, the absorber member is a copper sheet of substantial thickness to which a series of liquid carrying tubes is soldered. The absorber member is generally painted black and mounted on an insulating surface such as wood or foam which is in turn mounted in a collector frame tightly covered with one or two panels of glass. The glass helps prevent re-radiation of energy to the atmosphere and reduces losses by conduction and convection. Although such collectors are very simple, they are quite heavy and expensive due to the large amount of copper sheet and tubing they require. In view of the large amount of collector surface required in a typical solar heating installation, the expense of the installation has seldom been justified where alternate sources of energy have been available.

SUMMARY

It is among the objects of the present invention to provide a flat plate collector which is lower in cost, lighter in weight, and more efficient in collecting heat than prior art collectors. The collector is formed of a number of layers of different materials which are laminated together under heat and pressure. The base layer is preferably a cured glass epoxy laminate of a thickness between about 1/32 inch and ⅛ inch. Since the base layer performs as an insulator, it should have sufficient thickness for that purpose. It should also have sufficient thickness to be self supporting. A 1/16 inch thickness has been found suitable for both purposes. Postioned on top of the cured glass epoxy base sheet is an intermediate patterned layer of "pre-preg" or B-stage semi-cured glass epoxy or a sandwich comprising alternate stages of cured laminate and pre-preg with the pre-preg on the outside to function as a binder. The patterned layer may comprise a continuous outer border and intermediate strips spaced from the border. The border and intermediate strips define the sides of channels whose bottoms are defined by the cured base layer. The tops of the channels are defined by a thin sheet of a metal such as copper foil which is preferably flashed with brass or roughened to increase its bondability or a plastic film such as polyvinyl fluoride which can withstand temperatures of 450° F and which in thickness of 0.001–0.005 inches can be bonded to the intermediate layer. The entire composite is placed in a press which squeezes and heats the layers so as to cause the pre-preg to bond to the base sheet and to the top sheet as it cures. The intermediate layer can be about 0.005–0.060 inches in thickness while the metal foil or plastic film is about 0.001–0.007 inches in thickness and preferably about .0025 inches. The channel depth can be varied as desired, keeping in mind that a very shallow depth will improve heat transfer at the expense of greater pressure drop in the fluid passing through the channel while a greater depth will decrease pressure drop while also decreasing the amount of heat transfer to the fluid. A channel depth of about .030 inches has been found to work quite well.

DESCRIPTION OF THE PREFERRED EMBODIMENT

Figure 1:
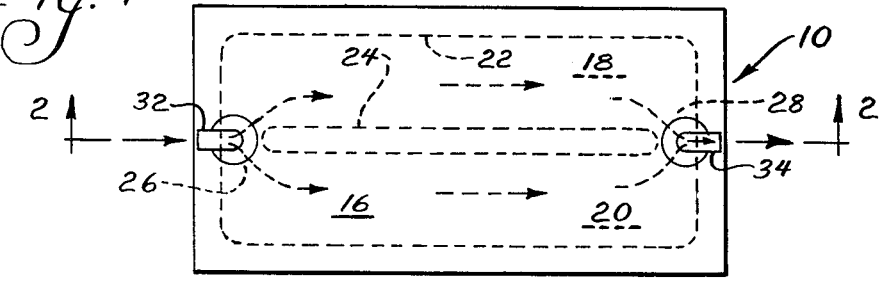
FIG. 1 is a top view of our improved flat plate absorber member.
Figure 2:
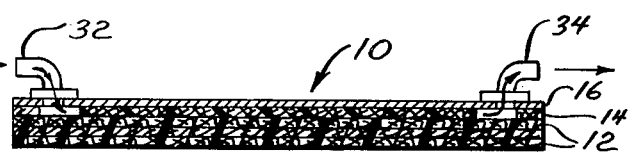
FIG. 2 is a side sectional view of the absorber member of FIG. 1 taken on line 2—2.

Referring to FIGS. 1 and 2, the improved flat plate absorber indicated generally at 10 includes a base insulating and support layer 12, a patterned intermediate layer 14 and a top layer 16. The patterned layer 14 may have any channel pattern desired but is shown as including a pair of channel portions 18, 20 defined by an outer rim portion 22 and an inner strip 24. The channels 18, 20 are joined at their inlet and outlet ends by connecting portions 26, 28 respectively. Heat transfer fluid such as water or water and antifreeze solution enters the collector 10 through an inlet fitting 32 and exits through an outlet fitting 34. The fittings 32, 34 are attached to the upper layer 16 in surrounding relationship to the apertures 36, 38 and are fastened to layer 16 by any suitable means such as solder where layer 16 is a metal foil or adhesive where layer 16 is a plastic film.

In operation, the collector 10 is preferably positioned at an angle to the horizontal so that the right side in FIG. 2 will be higher than the left. The angle is chosen depending on the particular location of the collector in order to maximize the collection of solar energy. By placing the outlet 34 higher than the inlet 32 the channels 18, 20 will always be filled with heat transfer fluid. Preferably, the upper layer 16 is painted black or is made of a black material to enhance its ability to absorb heat. As previously discussed, the layer 16 is extremely thin compared to prior art devices. The thinness of the layer 16 not only reduces the cost and weight of the collector substantially compared to thicker prior art collectors but provides faster and more efficient transfer of heat to the fluid flowing under it. Since the thinness of the layer 16 also reduces its ability to conduct heat sideways in the plane of the layer 16, it is desirable to minimize the width of spacer elements such as the strip 24 which it overlies and to maximize the width of the fluid channels 18, 20.

Figure 3:
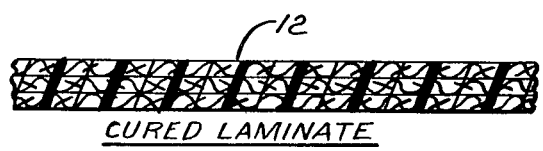
FIGS. 3–5 show the successive stages of building up the absorber member.
Figure 4:
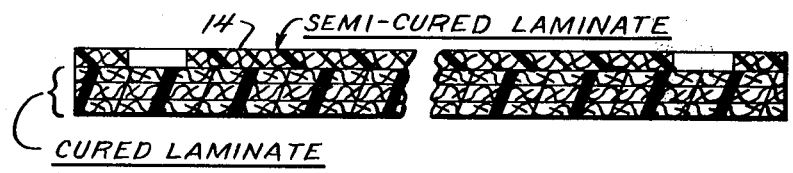
Figure 5:
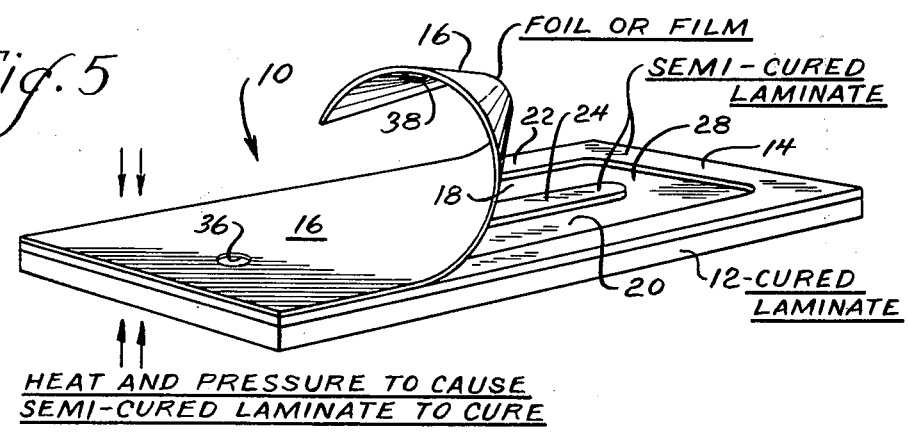

The steps involved in assembling the collector 10 are illustrated in FIGS. 3–5. FIG. 3 shows the base cured laminate layer 12 to which the semi-cured laminate or pre-preg layer 14 is assembled (FIG. 4). FIG. 5 illustrates the addition of the top heat absorbing sheet 16. After the three layers 12, 14 and 16 are assembled, heat and pressure is applied to the entire stack to cure the pre-preg layer 14 and cause it to bond to the layers 12 and 16 which are positioned beneath and above it. The fittings 32, 34 are then attached. Although not shown, the collector 10 is preferably covered during use by a transparent cover which allows the solar rays to reach the absorbent surface 16, but restricts re-radiation, protects the cover 16, and reduces convection losses.

We claim as our invention:

1. A method of forming an internally channeled absorber member for a flat plate solar collector comprising the steps of: overlaying a self-supporting, flat base sheet of fully cured glass epoxy laminate with a pre-cut, patterned layer of semi-cured glass epoxy; overlaying the patterned layer with a thin heat absorbing sheet; placing the composite so formed in a press; and squeezing said composite in the presence of heat until said semi-cured epoxy has cured and has bonded to the underlying base sheet and the overlying heat absorbing sheet.

2. A method of forming an internally channeled absorber member for a flat plate solar collector in accordance with claim 1 wherein said heat absorbing sheet is copper having a thickness of less than 0.0025 inches.

* * * * *